United States Patent
Stone et al.

(10) Patent No.: US 12,556,893 B2
(45) Date of Patent: Feb. 17, 2026

(54) DIGITAL TWIN INCIDENT RESPONSE

(71) Applicant: Tyco Fire & Security GmbH, Neuhausen am Rheinfall (CH)

(72) Inventors: John A. Stone, Milwaukee, WI (US); Ryan A. Piaskowski, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 736 days.

(21) Appl. No.: 17/853,224

(22) Filed: Jun. 29, 2022

(65) Prior Publication Data

US 2023/0007451 A1    Jan. 5, 2023

Related U.S. Application Data

(60) Provisional application No. 63/217,159, filed on Jun. 30, 2021.

(51) Int. Cl.
| | | |
|---|---|---|
| *H04W 4/33* | (2018.01) | |
| *G05B 15/02* | (2006.01) | |
| *G06F 30/20* | (2020.01) | |
| *H04W 24/08* | (2009.01) | |

(52) U.S. Cl.
CPC .............. *H04W 4/33* (2018.02); *G05B 15/02* (2013.01); *G06F 30/20* (2020.01); *H04W 24/08* (2013.01)

(58) Field of Classification Search
CPC ........ H04W 24/08; H04W 4/33; H04L 67/12; G06F 30/20; G05B 15/02; G05B 2219/25011
See application file for complete search history.

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |
| 5,581,478 A | 12/1996 | Cruse et al. |
| 5,812,962 A | 9/1998 | Kovac |

(Continued)

FOREIGN PATENT DOCUMENTS

| | | |
|---|---|---|
| AU | 2019226217 A1 | 11/2020 |
| AU | 2019226264 A1 | 11/2020 |

(Continued)

OTHER PUBLICATIONS

U.S. Appl. No. 17/566,029, Passivelogic, Inc.

(Continued)

*Primary Examiner* — Liton Miah
(74) *Attorney, Agent, or Firm* — Foley & Lardner LLP

(57) ABSTRACT

Systems and methods for providing on-premises response to an incident impacting a space of a building are provided. One method includes storing digital twins of one or more on-premises building devices of the building in a memory device within the space. The digital twins include digital representations of the on-premises building devices including data relating to the on-premises building devices. The method further includes receiving, by one or more processors within the space, data relating to the incident impacting the space, processing the data using the digital twins stored in the memory device within the space to determine a response to the incident, and executing an action to implement the response to the incident.

20 Claims, 10 Drawing Sheets

(56) References Cited

U.S. PATENT DOCUMENTS

| | | |
|---|---|---|
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,949,583 B2 * | 3/2021 | Ahmad ............... G06F 30/13 |
| 10,969,133 B2 | 4/2021 | Harvey |
| 10,976,068 B2 | 4/2021 | Hallendy et al. |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |

(56) References Cited

U.S. PATENT DOCUMENTS

| | | |
|---|---|---|
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |

(56) References Cited

U.S. PATENT DOCUMENTS

| | | |
|---|---|---|
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1* | 1/2019 | Sinha ............... F24F 11/46 |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1* | 5/2019 | Park ............... H04L 12/2812 |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0074832 A1* | 3/2020 | Vincent ............. G08B 21/0225 |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2018/232147 A1 | 12/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |

(56) References Cited

FOREIGN PATENT DOCUMENTS

WO  WO-2022/103829 A1  5/2022
WO  WO-2022/103831 A1  5/2022

OTHER PUBLICATIONS

U.S. Appl. No. 17/567,275, Passivelogic, Inc.
U.S. Appl. No. 17/722,115, Passivelogiv, Inc.
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings - The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 1, 2023 (480 pages total).
Digital Platform Litigation Documents Part 9, includes DDE-1-21-cv-01796 (documents filed Jan. 10, 2023-Nov. 1, 2022 (203 pages total).
El Kaed, C et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," Data'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.

(56) References Cited

OTHER PUBLICATIONS

International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).

* cited by examiner

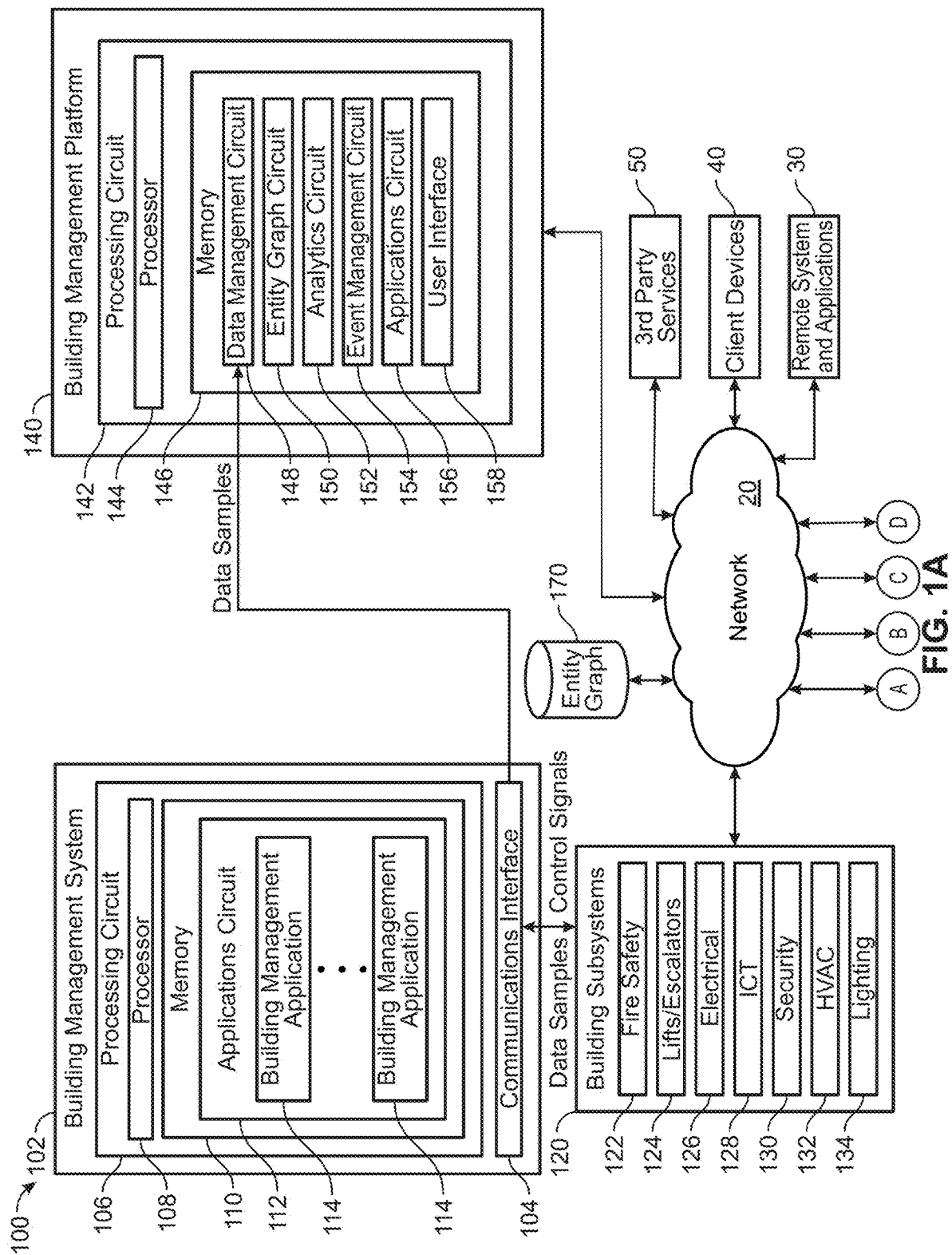

DIGITAL TWIN INCIDENT RESPONSE

CROSS-REFERENCE TO RELATED APPLICATIONS

The present application claims priority to and the benefit of U.S. Provisional Patent Application No. 63/217,159, filed Jun. 30, 2021, which is incorporated herein by reference in its entirety.

BACKGROUND

The present disclosure relates generally to the field of building management systems (BMSs). More specifically, various embodiments of the present disclosure relate to BMSs for responding to incidents in a building.

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof.

SUMMARY

One embodiment of the disclosure relates to a method of providing on-premises responses to an incident impacting a space of a building. The method includes storing digital twins of one or more on-premises building devices of the building in a memory device within the space, the digital twins comprising digital representations of the on-premises building devices including data relating to the on-premises building devices, receiving, by one or more processors within the space, data relating to the incident impacting the space, processing, by one or more processors within the space, the data using the digital twins stored in the memory device within the space to determine a response to the incident, and executing, by the one or more processors within the space, an action to implement the response to the incident.

BRIEF DESCRIPTION OF THE DRAWINGS

The above and other aspects and features of the present disclosure will become more apparent to those skilled in the art from the following detailed description of the example embodiments with reference to the accompanying drawings.

FIG. 1A is a block diagram of a smart building environment, according to an exemplary embodiment.

DETAILED DESCRIPTION

Overview

Figure 1B:
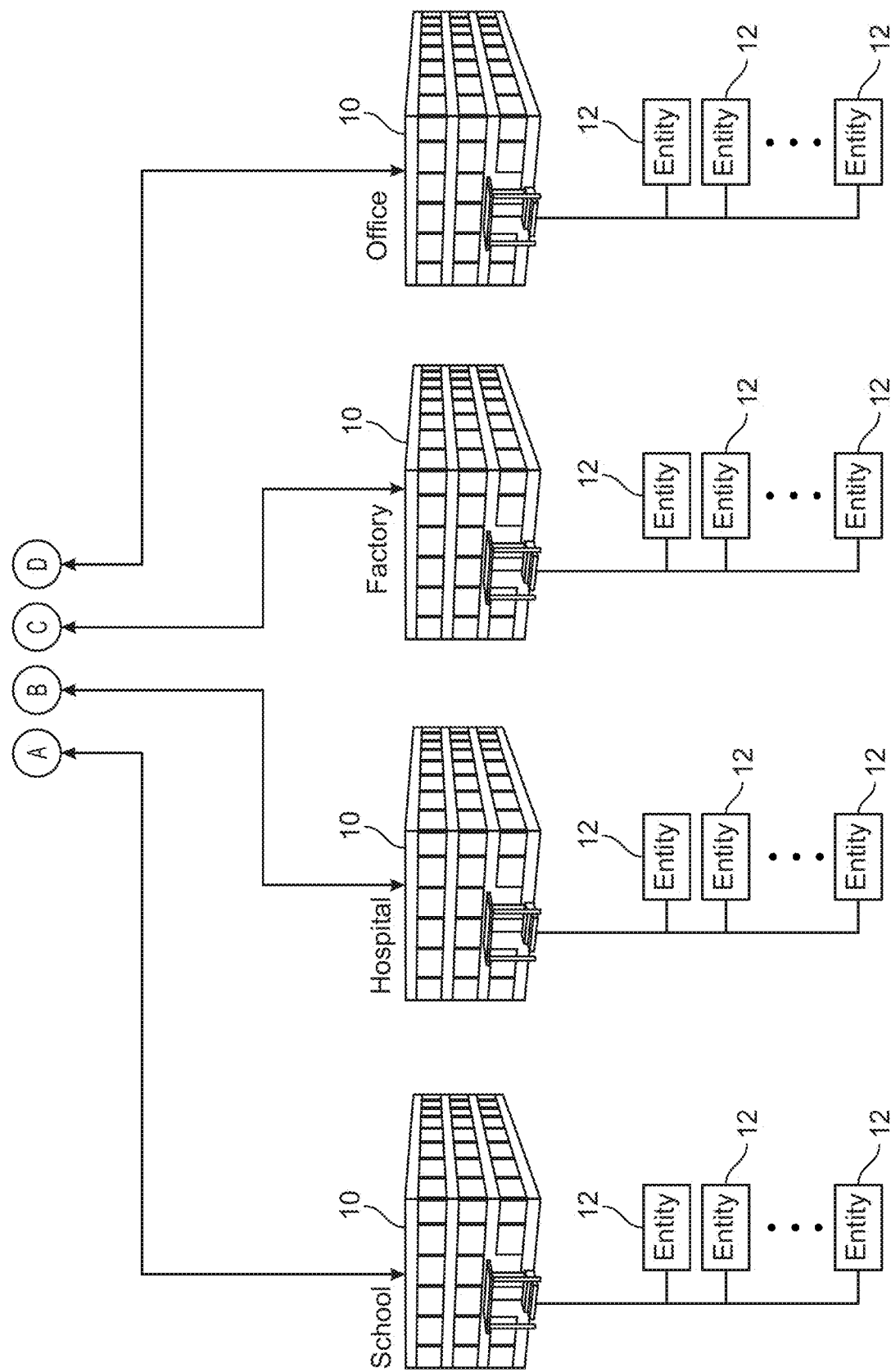
FIG. 1B is another block diagram of the smart building environment of FIG. 1A, according to an exemplary embodiment.

Referring generally to the FIGURES, systems and methods for a digital twin incident response system are shown, according to various exemplary embodiments. According to various embodiments, the digital twin incident response system may be configured to retrieve data relating to on-premises building devices, off-premise building devices, and/or non-building devices and use edge-based processing to determine a response to the data relating to the devices. In some embodiments, based on the received data, the digital twin incident response system may be configured to determine one or more potential incidents relating to the on-premises building devices or non-building devices (e.g., wireless routers on traffic lights, wireless routers in vehicles such as cars, trucks, boats, missiles, robots, drones, etc.) For example, the digital twin incident response system may be configured to determine that there is a risk of an incident of a fire starting at the building with the on-premises devices. As another example, the digital twin incident response system may be configured to determine a potential incident of an active threat in the building. The digital twin incident response system may then be configured to determine at least one potential response for each potential incident simulated by the digital twin incident response system. As another example, the digital twin incident response system may be configured to determine the firing order of a plurality of missiles within a missile defense network. As a final example, the digital twin incident response system may be configured to develop and implement a response to a nuclear incident. In this case, the digital twin incident response system may send sensors on drones into the vicinity of a nuclear reactor after an incident to map a radiation cloud and collaborate with the digital twins in nearby building to implement a response to the incident (e.g., evacuating a building if the radiation cloud gets to close). In some embodiments, the digital twin incident response system may be configured to analyze each of the potential responses and determine relative risks of each of the potential responses to a potential incident. For example, the digital twin incident response system may determine that instructing assets to relocate to a certain room or area of a building during an incident of a tornado increases the relative risks of that potential response. The digital twin incident response system may then be configured to transmit data indicating the potential incidents and at least one of the potential responses to at least one on-premises building device. In some embodiments, the digital twin incident response system selects a potential response to transmit to the on-premises building devices based on the relative risks of the potential responses. For example, the digital twin incident response system may be configured to transmit one response with the lowest associated risk to an on-premises building device.

In some applications, models of incidents and responses may exist in cloud networks and large data centers, analyzed by teams of data scientists to extract meaningful information and interpret the data. However, such systems require a vast amount of data, time, and computer processing power to support these functions. Due to this need for a large amount of processing power, time, and data, the simulated incidents and responses to the incidents are not available to devices (e.g., on-premises devices) at sites soon enough to provide optimal responses to a developing incident. Further, impacted buildings may not have the necessary access to electrical power, network availability, and/or network bandwidth needed to model alternative responses to various incidents and/or received such models from off-premises (e.g., cloud/data center) devices. In particular, incidents that develop rapidly, that are impacted by constantly changing internal and/or external parameters, and/or that include constantly changing responses to the incident, do not allow sufficient time, computer resources, or knowledge to fully take advantage of the benefits of modeling potential incidents and responses to incident scenarios.

The implementation of on-premises digital twin wireless routers (DTWRs) can allow the generation and transmission of real-time, artificial intelligence (AI) based responses as incidents begin to develop. By using edge-based processing facilitated by the DTWRs associated with various building entities, the digital twin incident response system may enable building managements systems to respond to incidents without relying on cloud based networks which may not be available in the case of an incident. In some embodiments, the digital twin incident response system may work in conjunction with a cloud based network to develop a response to an incident. In some embodiments, the DTWRs may be associated with non-building entities such as traffic signs, vehicles, robots, drones, and/or people. The digital twin incident response systems described herein may proactively model potential incidents and possible responses to instruct a building management system to take corrective actions in order to resolve the incident. Thus, optimal responses to an incident may be implemented more immediately after the development of an incident. As such, the incident may be resolved before the incident may have a significant impact on a building site and/or other entities (e.g., people, equipment, areas of a building, etc.) of the site.

While the present disclosure discusses utilizing digital twins, it should be understood that, according to various embodiments, the features of the present disclosure may be utilized in conjunction with any type of data, including data that may not be considered a digital twin. All such modifications are contemplated within the scope of the present disclosure.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include building management platform 140. The building management platform 140 and other computing devices described herein may be a part of a computing system that includes a single off-premises server, several off-premises servers (e.g., a distributed system of multiple servers), a cloud computing system, and/or edge devices (e.g., on-premises computing devices and/or sensors, one or more on-premises servers, etc.) of the computing system. Building management platform 140 may be configured to collect information from a variety of different data sources. Building management platform 140 may create digital representations, referred to as "digital twins," of physical spaces, equipment, people, and/or events based on the collected information. In some embodiments, the generation of digital twins can, additionally or alternatively, be done in edge devices of the network environment. In various embodiments, the digital representations are stored in an entity graph. In other embodiments, the digital representations may be stored in another type of document database (e.g., an Oracle relational database, a MongoDB document database, and so on).

In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between a variety of different data sources. Each of the data sources may be implemented as, include, or otherwise use respective agents for facilitating communication amongst or between the data sources and building management platform 140. The agents of building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, building management platform 140 may interact with a number of buildings, each of which may include an agent (or a group of agents corresponding to various building subsystems within the respective building), to receive information. Hence, the building management platform 140 and the data sources may together form a network of agents to facilitate artificially intelligent exchange and communication of information across various channels. In some embodiments, one or more device(s), component(s), space(s) (and sets of devices, components, spaces) within building management platform 140 may include a respective agent dedicated to perform various tasks associated therewith. The agents may therefore be dedicated for performing separate functions or tasks.

In various embodiments, building management platform 140 collects data from buildings 10. For example, building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference in their entireties.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, applications, and/or other items capable of communicating data over an electronic network (e.g., smart lights, smart appliances, smart home hub devices, etc.). In some embodiments, entities 12 include events such as meetings, fault indications, alarms, and the like. In various embodiments, building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiments, each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Building management platform 140 and/or BMS 102 may interact with a variety of external systems. For example, building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or building management platform 140 are implemented within a single computer (e.g., one server, one housing, etc.). In various other embodiments, BMS 102 and/or building management platform 140 are distributed across multiple servers or computers (e.g., that can exist in distributed locations). In some embodiments, functions of BMS 102 and/or building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Building management platform 140 is shown to include processing circuit 142 having processor 144 and memory 146. In some embodiments, building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a person. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with building management platform 140 and/or BMS 102. For example, a user may update personalized preferences associated with operation of building management platform 140 via user interface 158. In some embodiments, user interface 158 facilitates dynamic feedback (e.g., a natural user interface, etc.). For example, user interface 158 may facilitate chatbot interaction, voice commands, user authentication, biometric feedback, or the like.

Figure 2:
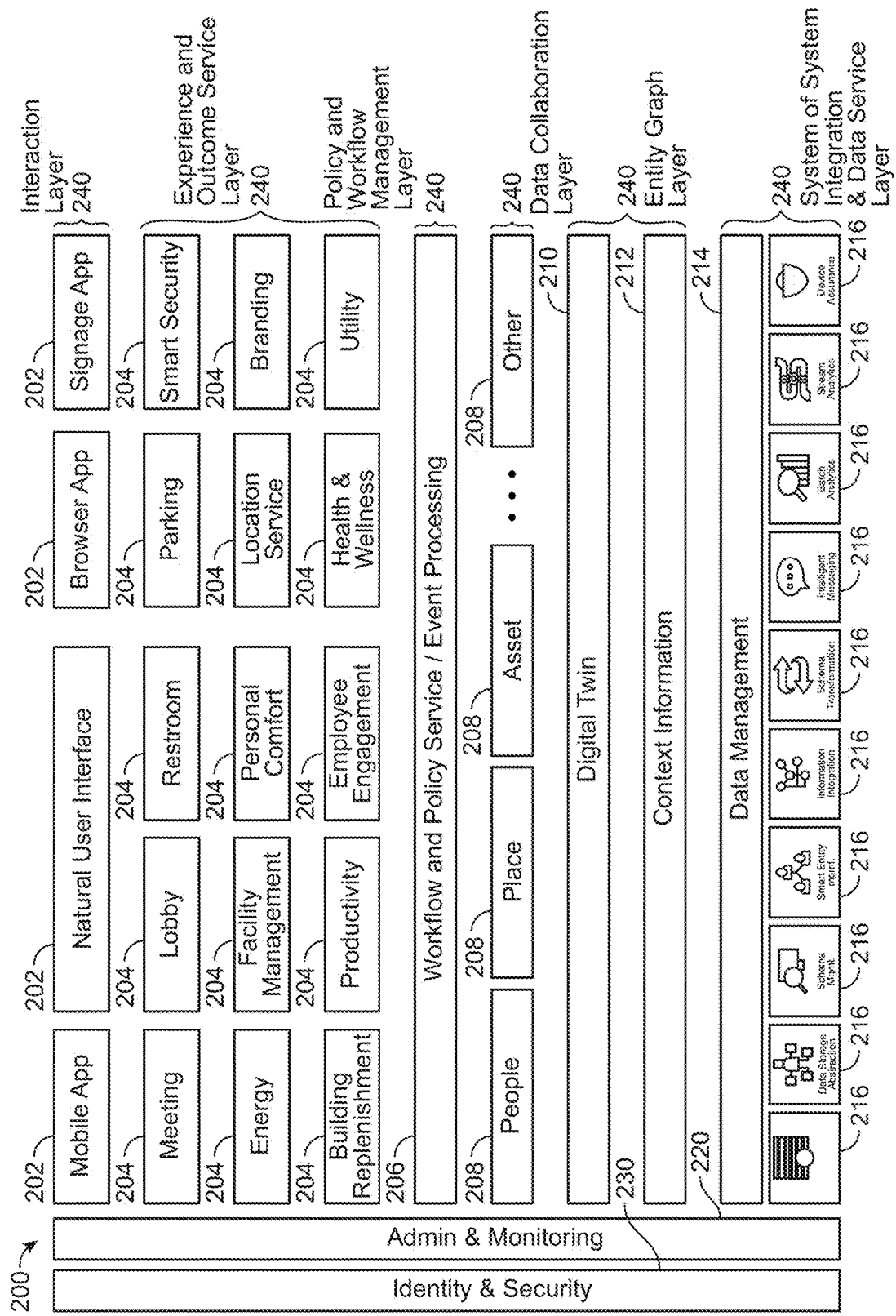
FIG. 2 is a block diagram of a building data platform associated with the smart building environment of FIGS. 1A-1B, according to an exemplary embodiment.

Referring now to FIG. 2, a building data platform 200 associated with the smart building environment 100 is shown, according to an exemplary embodiment. In various embodiments, building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogeneous source data schema as an open source common data model (e.g., a Brick Schema/extensions, etc.). In other embodiments, data source(s) 208 represent heterogeneous source data schema as an open source common data model, such as Haystack or a proprietary schema.

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active computing process. For example, a digital twin 210 may communicate with other digital twins 210, to sense, predict, and act. In various embodiments, digital twin 210 is generated dynamically. For example, a digital twin 210 corresponding to a conference room may update its status by looking at occupancy sensors or an electronic calendar (e.g., to turn its status "available" if there is a no show for a scheduled meeting, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations. For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
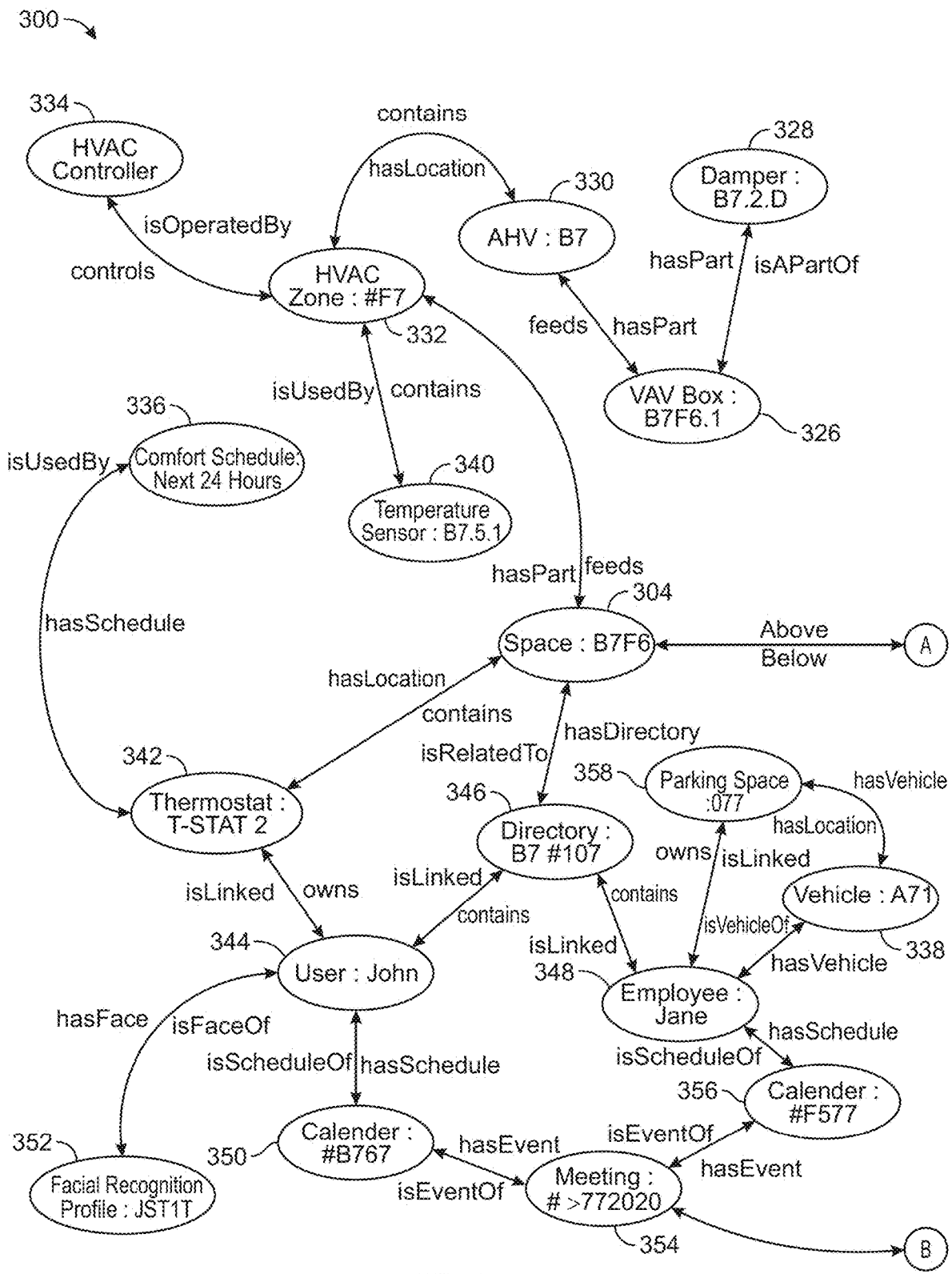
FIG. 3A is a block diagram of an entity graph, according to an exemplary embodiment.
Figure 3B:
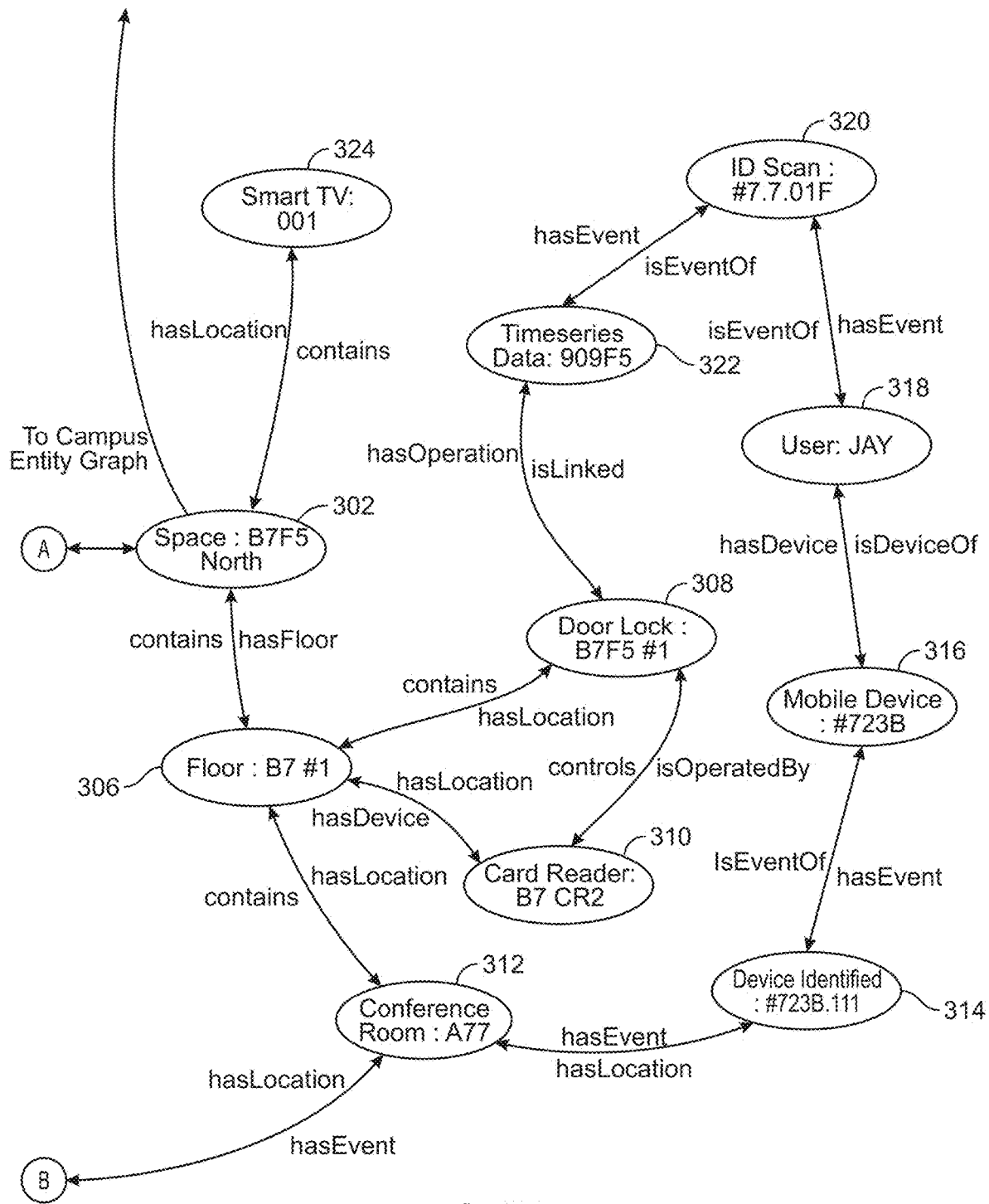
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/ or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships between entities. While the nodes represent the building and its components, the edges describe how the building operates. The nodes and edges together can create an overall digital twin of a particular building. In some embodiments, the entities include properties or attributes describing the entities (e.g., a thermostat may have a particular model number attribute). The components of the entity graph form large networks that encode semantic information for a building.

The entity graph may be configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayered system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in this office) these applications may never reach full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph may be configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data is received and ingested into entity graph 300. For example, building management platform 140 may be configured to identify a door lock and card reader and generate a number of nodes and edges in entity graph 300 representing the card reader controller operation of the door lock.

Digital Twin Incident Response

Delayed response times to incidents can be extremely costly to building premises. For example, a fire at a site, such as an office building, a gas station, a retail store, a clinic, a kiosk, an automatic teller machine (ATM), etc., can quickly destroy expensive assets, some of which may not be replaceable. Typically, in these cases, building management systems may require manual management of these incidents which may cause major delays and costs. For example, a fire may break out in one campus building. Manual management of that incident may include managers determining the location of the fire and manually implementing standard operating procedures to respond to the fire. Because this process is not automated, there may be significant delays caused by human error, lack of visibility to information about the fire, etc. Furthermore, if a fire breaks out in a campus building that is in close proximity to other campus buildings, that information would need to be communicated to the other buildings. Manually, building managers could communicate this information through typical communication means such as phone calls, text messages, or emails. This is not ideal though because this method of communication is very prone to human error (forgetting to call, email, or text while trying to manage the fire in their own building, typical communication means not being available because the incident is interfering etc.).

In yet another additional example, an edge device (e.g., a router) positioned in buoys above off-shore oil wells may respond to acoustic signatures of leaks in the oil well. An incident of a leak in an oil well can cause loss of production, safety issues, and severe environmental threats to the surrounding area. Therefore, corrective actions for an incident of a leak can mitigate more of the negative effects of the incident the sooner the actions are implemented to resolve the incident. In some embodiments, a response to an incident that is associated with the least amount of risk is not a clear response. In other embodiments, the fact that a response is needed may not be obvious. This may especially be exacerbated in cases with risk assessment that involves correlation of data from several internal and external sources.

In yet another additional example, an edge device (e.g., a router) may be positioned within a missile which may be a part of a missile defense system. An incident may trigger missile deployment but it may not be clear when and where the missiles should be fired or in what order the missiles should be fired. If a correct incident response is not developed and implemented quickly, this may lead to catastrophic loss of life and equipment. Therefore, a digital twin incident response system is needed to quickly and effectively respond to various incidents.

As mentioned above, the digital twin wireless routers (DTWRs) are associated with different building entities and may be within edge devices associated with the different building entities (e.g., access points, routers, sensors, etc.). Each DTWR may stores a digital twin that is a digital representation of one or more building entities (e.g., devices, people, spaces, etc.) on an edge device. Additionally, each DTWR may process data indicative of a building incident occurring to develop a response to the building incident. Digital twins associated with one or more building entities may stream data between themselves in order to determine one or more collaborative responses to an incident. In some embodiments, the one or more responses to an incident may be stored within the digital twins or in connection with the digital twins that the response impacts. Though the embodiments shown within the present disclosure describe DTWRs associated with different building entities, it is to be understood that those embodiments are only exemplary and that DTWRs in other embodiments may be associated with non-building devices.

The application of digital twin wireless routers (DTWRs) with an on-premises digital twin incident response system can permit DTWRs to identify and evaluate risks and potential incidents that take local context (e.g. what's happening in an operating room, on a person, in a parking structure . . . ) into account. DTWRS may be able to evaluate and select an optimal response to an incident based on input from multiple DTWRs that model current and future risk scenarios to provide multiple perspectives so that the resultant risk mitigation solutions apply to an entire building, conference, operation, campus, or city. In some embodiments, manual management decisions are replaced by more relevant model-based decisions that can be made in significantly less time based on parameters set by management, so that incidents can be addressed before they impact people, buildings, or assets, etc. Additionally, automated management by DTWRs may facilitate a response to incidents in situations where management is unavailable or unable to participate.

In some embodiments, DTWRs from different buildings within a geo-fenced area (such as a campus) may communicate with each other so as to coordinate a collaborative response to incidents that develop within the geo-fenced area. Managers can set parameters in the form of management mitigation parameters that ensure that responses are consistent with management parameters. Information is also able to management personnel on the current status of incident response implementation.

Figure 4:
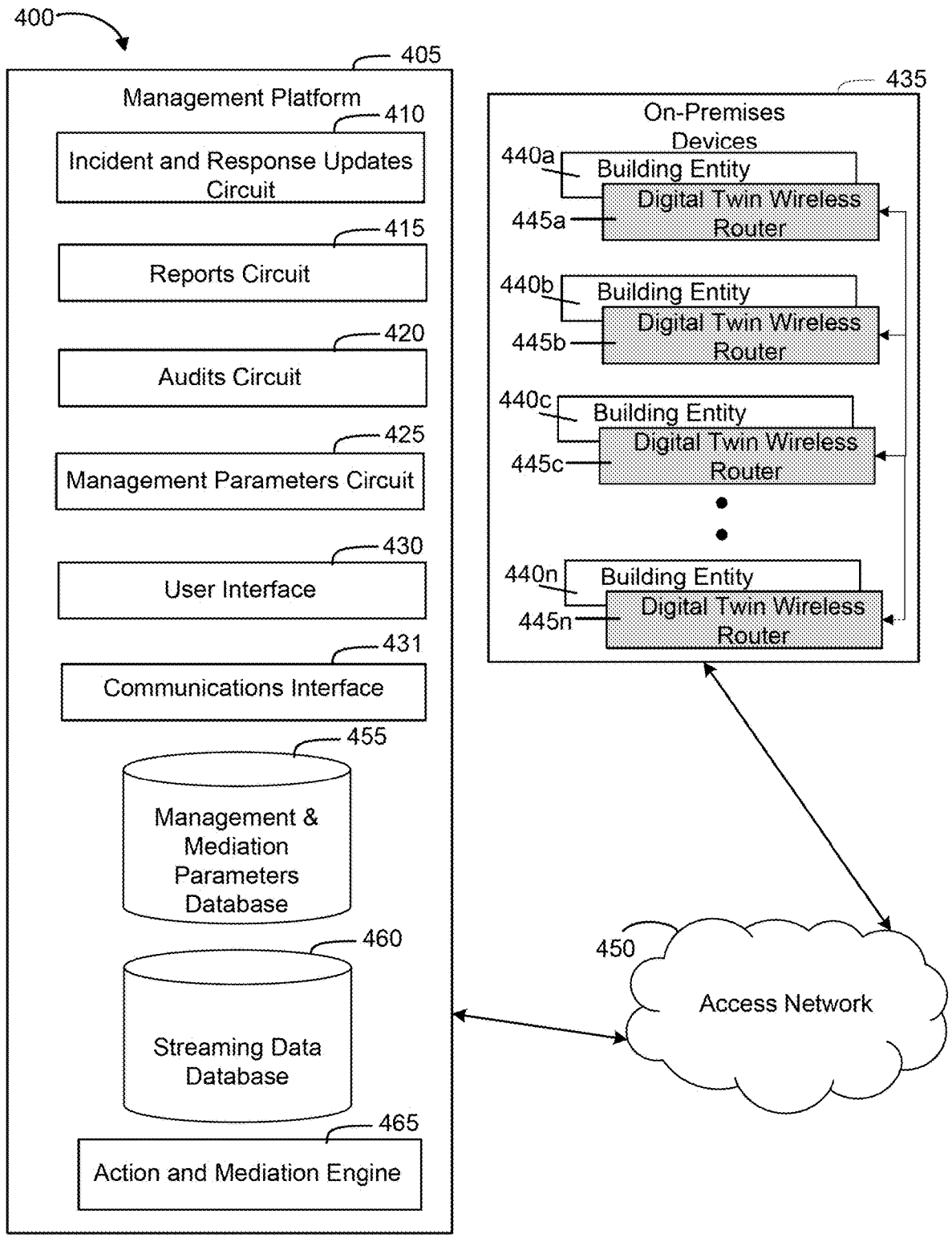
FIG. 4 is a block diagram of an on-premises digital twin incident response system, according to an exemplary embodiment.

Referring now to FIG. 4, a digital twin incident response system 400 is shown, according to an exemplary embodiment. In some embodiments, the digital twin incident response system 400 may be configured to determine and analyze various potential incidents impacting a building, building device, or other building assets and determine an appropriate response to the aforementioned incident. In some embodiments, the digital twin incident response system 400 includes a plurality of on-premises devices 435, access network 450, and management platform 405. Management platform 405, on-premises devices 435, and/or digital twin wireless routers (DTWRs) 445a-445n may have one or more processors and one or more memories configured to store instructions executable by the processors to implement the features described herein, in some embodiments.

The plurality of on-premises devices 435 shows various DTWRs 445a-445n associated with various building entities 440a-440n. Each of the DTWRs 445a-445n store a digital twin that is digital representation of each building entity 440a-440b. For example, a building entity could be an entire building such as daycare center and it would have an associated daycare center DTWR. Another building entity could be the HVAC system of a campus or building and it would have an associated HVAC DTWR. In yet another example, a building entity could be a room or space within a building such as a conference room, lobby, or parking lot and it would have an associated room DTWR. In a final example, a building entity could be people associated with the building such as employees or visitors and they would have wearable DTWRs associated with them. DTWRs associated with building entities model risks and potential incidents based on data received from one or more digital twins associated with building entities 440a-440n. Additionally, the DTWRs stream the context-based modeling results, along with their status, over access network 450. This data may include conditions, risk profiles, vulnerabilities, and incidents along with potential responses to address the incidents. This streaming data may be made available to all DTWRs on the access network 450 which can be leveraged for collaboration, prediction, detection modeling and responding to incidents.

It should be understood that, in various embodiments, a single on-premises device 435 may serve as or house multiple DTWRs corresponding to multiple digital twins/building entities. For example, a single on-premises server or other computing device (e.g., a computing device or networking/communications device for a building, a floor, a zone, a room or set of rooms, etc.) may house and/or otherwise manage digital twins for multiple building entities (e.g., pieces of building equipment, people, spaces, etc.). In some embodiments, one or more building devices may serve as DTWRs for themselves and house digital twins for the devices, and/or dedicated devices and/or sensors may serve as DTWRs for a single piece of building equipment. In some embodiments, multiple computing devices or pieces of building equipment may work in concert to act as DWTRs for one or more digital twins of building entities. All such modifications are contemplated within the scope of the present disclosure. Additionally, it should be understood that any type of equipment or computing device capable of communication and processing may be a DTWR, and DTWRs, as discussed herein, are not limited to networking routers or even networking equipment in general.

Access network 450 may be configured to facilitate communication between the management platform 405 and the plurality of on-premises devices 435. In some embodiments, access network 450 also facilitates communication between various DTWRs (e.g., 445a-445n) associated the access network 450. For example, DTWRs corresponding to multiple digital twins/building entities may stream data including their context-based modeling results along with their status over access network 450 to the management platform 405 and other DTWRs on the network. The streaming data may then be stored within the streaming data database 460. Access network 450 is located on-premises which allows for DTWRs to communicate and implement a response to an incident even when communication with a cloud is unavailable. In some embodiments, access network 450 may be a 3G, 4G, 5G, 6G, LTE, WiFi, Bluetooth, satellite or any other type of network.

Management platform 405 may be configured to help managers see and understand incidents and responses as they develop. Digital twin incident response system 400 may automate the process for responding to incidents but managers might be interested in seeing updates about incidents and their responses. Managers might also be interested in inputting management parameters that set guidelines for incident responses. In some embodiments, the management platform 405 may include a management and mediation parameters database 455 that may be configured to store management and mediation parameters (e.g., standard operating procedures) set by management personnel. In some embodiments, the management platform 405 may also include an action and mediation engine 465 that may be configured to develop an incident response to an incident. Action and mediation engine 465 is explained in more detail in the following paragraphs with respect to FIG. 5. In some embodiments, management platform 405 may also include an incident and response updates circuit 410 that may be configured to provide updates about the incident and its related responses to management personnel through user interface 430. Management platform 405 may also include reports circuit 415 that may be configured to provide reports about the status of various building entities to management personal through the user interface 430. Management platform 405 also includes audits circuit 420 that may be configured to audit various buildings entities and make this information available to management personnel through user interface 430. Management platform 405 also includes management parameters circuit 425 wherein management personnel may communicate their parameters for incident responses. For example, if a smoke alarm goes off in a certain building, management personal have a preferences that people exit the building through a certain area. Management personnel may communicate these parameters through user interface 430 and/or communication interface 431 to the management parameters circuit 425. These management parameters are then stored in the management and mediation parameters database 455. Communications interface 431 may be configured to facilitate communications between management platform 405, on premises devices 435, and access network 450. In some embodiments, the management platform may be located within one or more of the DTWRs corresponding to multiple digital twins/building entities (e.g., DTWRs 445a-445n), an off-premises server, an on-premises server, or a cloud.

Figure 5:
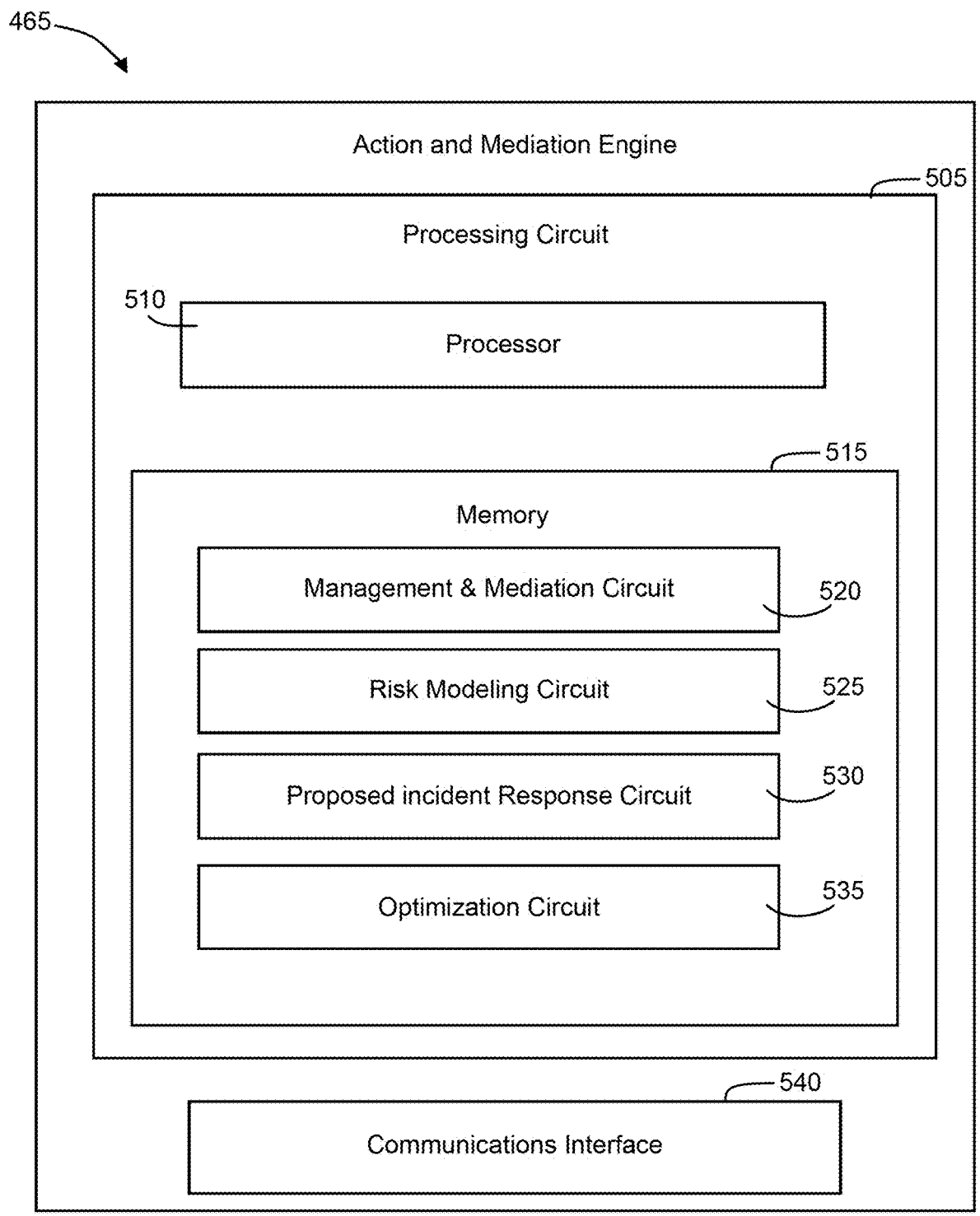
FIG. 5 is a block diagram of an action and mediation engine, according to an exemplary embodiment.

Referring now FIG. 5, a more detailed look at action and mediation engine 465 is shown according to an exemplary embodiment. In some embodiments, action and mediation engine 465 may be configured mediate differences and conflicts among different DTWRs corresponding to multiple digital twins/building entities based on mediation parameters, which may be set by management personal. Action and mediation engine 465 may also be configured to select and optimal response to an incident that may affect one or more DTWRs. Action and mediation engine 465 takes the combination of streaming data from each DTWR and the management mediation parameters set by management personnel to model and evaluate potential risk mitigation solutions proposed by individual DTWRs and to provide a set of proposed incident responses. These proposed incident responses may then communicated to each individual DTWR so that each DTWR can do its own assessment of the incident and the proposed incident response based on its unique needs. Action and mediation engine 465 may then evaluate this assessment and choose an optimum incident response plan that can be implemented within the mediation parameters set by management personnel. Action and mediation engine 465 may then facilitate the implementation of the optimum incident response plan by one or more DTWRs. The implementation plans, along with the implementation's progress and results may be updated in real-time in response to change and may be communicated and displayed on user interface 430. In some embodiments, the action and mediation engine 465 may be located within one or more DTWRs.

In some embodiments, action and mediation engine 465 includes processing circuit 505 and communications interface 535. Processing circuit 505 includes processor 510 and memory 515. Processor 510 may be a general purpose or specific purpose processor, an application specific integrated circuit (ASIC), one or more field programmable gate arrays (FPGAs), a group of processing components, or other suitable processing components. Processor 510 may be configured to execute computer code or instructions stored in memory 515 or received from other computer readable media (e.g., CDROM, network storage, a remote server, etc.). In some embodiments, action and mediation engine 465 may be a part of a broader platform, such as management platform 400, and may be implemented using the processor(s) and/or memory/memories of platform 400.

Memory 515 may include one or more devices (e.g., memory units, memory devices, storage devices, or other computer-readable media) for storing data and/or computer code for completing and/or facilitating the various processes described in the present disclosure. Memory 515 may include random access memory (RAM), read-only memory (ROM), hard drive storage, temporary storage, non-volatile memory, flash memory, optical memory, or any other suitable memory for storing software objects and/or computer instructions. Memory 515 may include database components, object code components, script components, or any other type of information structure for supporting the various activities and information structures described in the present disclosure. Memory 515 may be communicably connected to processor 510 via processing circuit 505 and may include computer code for executing (e.g., by processor 510) one or more processes described herein.

Memory 515 includes management and mediation circuit 520, risk modeling circuit 525, proposed incident response circuit 530, and optimizing circuit 535. Management and mediation circuit 520 may be configured to mitigate differences and conflicts among DTWR risks based on mediation parameters set by management personnel. For example, let us say a hospital is experiencing a power outage incident. Management and mediation circuit 520 may receive risk alerts from DTWRs associated with various parts of the hospital such as the lobby, intensive care unit (ICU), waiting areas, etc. Management and mediation circuit 520 can manage these different alerts and prioritize emergency power distribution within the hospital according to mediation parameters. In some embodiments, management and mediation circuit 520 may also be configured to manage parameters associated with various, potential risks to entities of a building. For example, management and mediation circuit 520 may update a set of risks for a particular entity (e.g., person, building device, etc.) on-site, such as device failure, compromised data from hacking, fires, tornadoes, etc. In various embodiments, management and mediation circuit 520 may be configured to receive input from data sources (such as DTWRs 445a-445n), through streaming data database 460, on which risk factors are a greater threat to entities than other factors. For example, the management and mediation circuit 520 may receive, via access network 450, an instruction from a client that owns a building that greatly values data security, such as a financial institution, that compromised data is the greatest risk factor. As such, the management and mediation circuit 520 may be configured to weigh more heavily the risk of compromised data while evaluating risk levels for various potential incidents.

Risk modeling circuit 525 may be configured to model and evaluate potential risk incident responses proposed by the DTWRs and by its own risk modeling circuit. DTWRs individually model risks and determine potential risk incident responses. The DTWRs then stream these modeling results, along with their status, to action and mediation engine 465 over access network 450 to other DTWRs corresponding to multiple digital twins/building entities. Risk modeling circuit 525 then communicates these modeling results, through communications interface 540, to proposed incident circuit 530. Proposed incident circuit 530 may be configured to use a combination of the modeling results from each DTWR and a set of management and mediation parameters that are maintained by management personnel, to develop set of proposed incident responses. These proposed incident responses are then communicated to each individual DTWR so that they can evaluate the responses based on their unique needs and make an assessment. Optimization circuit 535 may be configured to evaluate the assessments from each DTWR and choose an optimum incident response plan that can be implemented within parameters set by management personnel.

Figure 6:
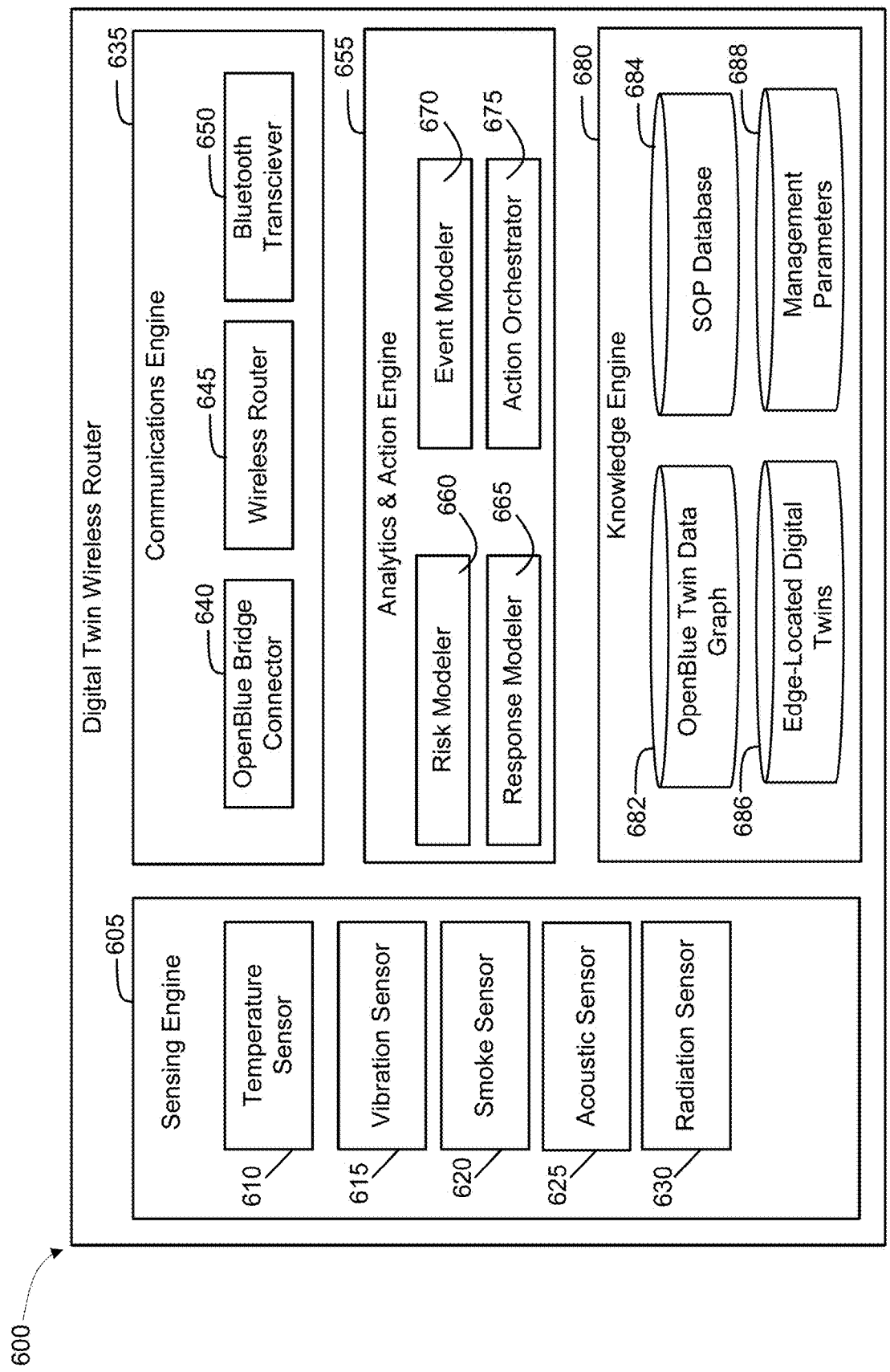
FIG. 6 is a block diagram of a digital twin wireless router, according to an exemplary embodiment.

Referring now to FIG. 6, a digital twin wireless router (DTWR) 600 is shown in more detail according to an exemplary embodiment. DTWR 600 stores a digital twin that is a digital representation of one or more building entities (e.g., devices, people, spaces, etc.). In some embodiments, DTWR 600 may be configured to stream data (e.g., in real-time or near real-time) over access network 450 on conditions, risk profiles, vulnerabilities, and incidents along with potential responses and standard operating procedures to address the incidents. The streaming data is leveraged for collaboration, prediction, detection modeling and responding to incidents. Generally, DTWRs correspond to multiple digital twins/building entities (e.g., building spaces, employees, visitors, day care centers, parking structures, control systems, etc.).

DTWR 600 includes sensing engine 605, communication engine 635, analytics and action engine 655, and knowledge engine 680. Since each DTWR is associated with a corresponding digital twins/building entity, sensors are necessary to monitor to the entities and report on any potential risk incidents that may arise. Sensing engine 605 includes temperature sensor 610 which may be configured to measure temperature that may be useful for helping identify fires. Sensing engine 605 includes vibration sensor 615 that may be helpful in identifying risk events such as natural disasters (e.g., earthquakes, hurricanes, tornadoes, etc.) Sensing engine 605 includes smoke sensor 620 that may be configured to identify fire incidents. Sensing engine 605 includes acoustic sensor 625 and radiation sensors 630 that may be configured to identify other risk incidents. The sensors mentioned here are only meant to be exemplary and not limiting. DTWR 600 may include more or less sensors than shown here.

DTWR 600 includes communications engine 635 which may be configured to facilitate communication between sensing engine 605, analytics and action engine 655, and knowledge engine 680. Additionally, communication engine 635 may also facilitate communication between DTWR 600 and other DTWRs associated with access network 450. Communications engine 635 may also facilitate communication between DTWR 600 and other parts of the digital twin incident response system 400 (e.g., management platform 405, action and mediation engine 465, etc.) Communications engine 635 can facilitate communication in a variety of different ways. For example, communications engine can facilitate communication through bridge connector 640, wireless router 645, and transceiver 650. The transceiver 650 may be a Bluetooth transceiver, a WiFi transceiver, a cellular transceiver, or a satellite transceiver. The communication methods mentioned here are only meant to be exemplary and not limiting. DTWR 600 may include more or less communications methods than shown here.

DTWR 600 also includes analytics and action engine 655 that may be configured to model and analyze risk incidents, determine potential responses to the risk incident, and implement incident responses. Analytics and action engine 655 includes risk modeler 660, response modeler 665, event modeler 670, and action orchestrator 675. Risk modeler 660 may be configured to model the risk profiles and potential incidents and determine incident risk levels for different events. Response modeler 665 may be configured to evaluate incident risk levels for different events and risk profiles and determine an appropriate incident response based on management parameters 688. Action orchestrator 675 may be configured to implement the appropriate incident response based on standard operating procedures may require.

DTWR 600 also includes a knowledge engine 680 that houses information necessary for the operation of the DTWR 600. Knowledge engine 680 includes a twin data graph 682, standard operating procedure database 684, edge-located digital twins 686, and management parameters 688.

To better understand how DTWR 600 functions, let us look at a use case. Take a campus with a plurality of buildings. A first building (Building #1) has offices and a daycare center with 15 employees, 20 children, and 4 care givers. Risk modeler 660 receives an occupancy report (through bridge connector 640) that there are 20 children in the childcare center. Transceiver 650 reports 20 children badges (wearable DTWRs), 15 employee badges (wearable DTWRs), and 4 care giver badges (wearable DTWRs) validating the occupancy report. As we can see from this example, each of the DTWRs store digital twins on an edge device (e.g., the employee, children, and caregiver badges) and process data from one or more digital twins in order to determine an incident response on the edge devices. Additionally, DTWRs can reside in any other type of edge device associated with a space such as access points, routers, sensors (e.g., occupancy sensors, location sensors, smoke alarms, temperature sensors, etc.).

Risk modeler 660 determines a high occupancy risk profile for Building #1 because it houses the child care center with 15 children. Risk modeler 660 reports this high risk profile to the twin data graph 682 through the bridge connector 640 and to other DTWRs through the access network 450. A second building (Building #2) is an executive briefing center that is currently unoccupied. Risk modeler 660 determines low occupant risk profile because the building is unoccupied. Risk modeler 660 reports this low risk profile to the twin data graph 682 through bridge connector 640 and to other DTWRs through the access network 450. A smoke alarm goes off in building #2. Since this is just one smoke alarm in a building, it is not deemed high risk but it is communicated to all the other DTWRs associated with the other buildings on campus. Simultaneously, temperature sensors associated with building #1 also report higher than normal temperatures in building #1. Risk modeler 660 models multiple scenarios based on smoke alarm in building #2 and rising temperatures in building #1 and determines that there is moderate fire risk.

Risk modeler 660 reports this moderate fire risk to twin data graph 682 through bridge connector 640 and to other DTWRs through the access network 450. Response modeler 660 evaluates the combination of moderate fire risk and high occupant risk for building #1 against management parameters 688 and passes message to action orchestrator 675 to evacuate daycare center. Action orchestrator 675 implements a fire evacuation SOP retrieved from SOP database 684. This SOP may include notifying care givers through smart phones and PA system of fire risk and ordering care givers to evacuate child care center, opens windows and opens doors at nearest building exit. Action orchestrator 675 also reports this moderate fire risk to twin data graph 682 through bridge connector 640 and to other DTWRs through the access network 450. Action orchestrator also reads badges on children and care givers to validate that the evacuation is completed.

Figure 7:
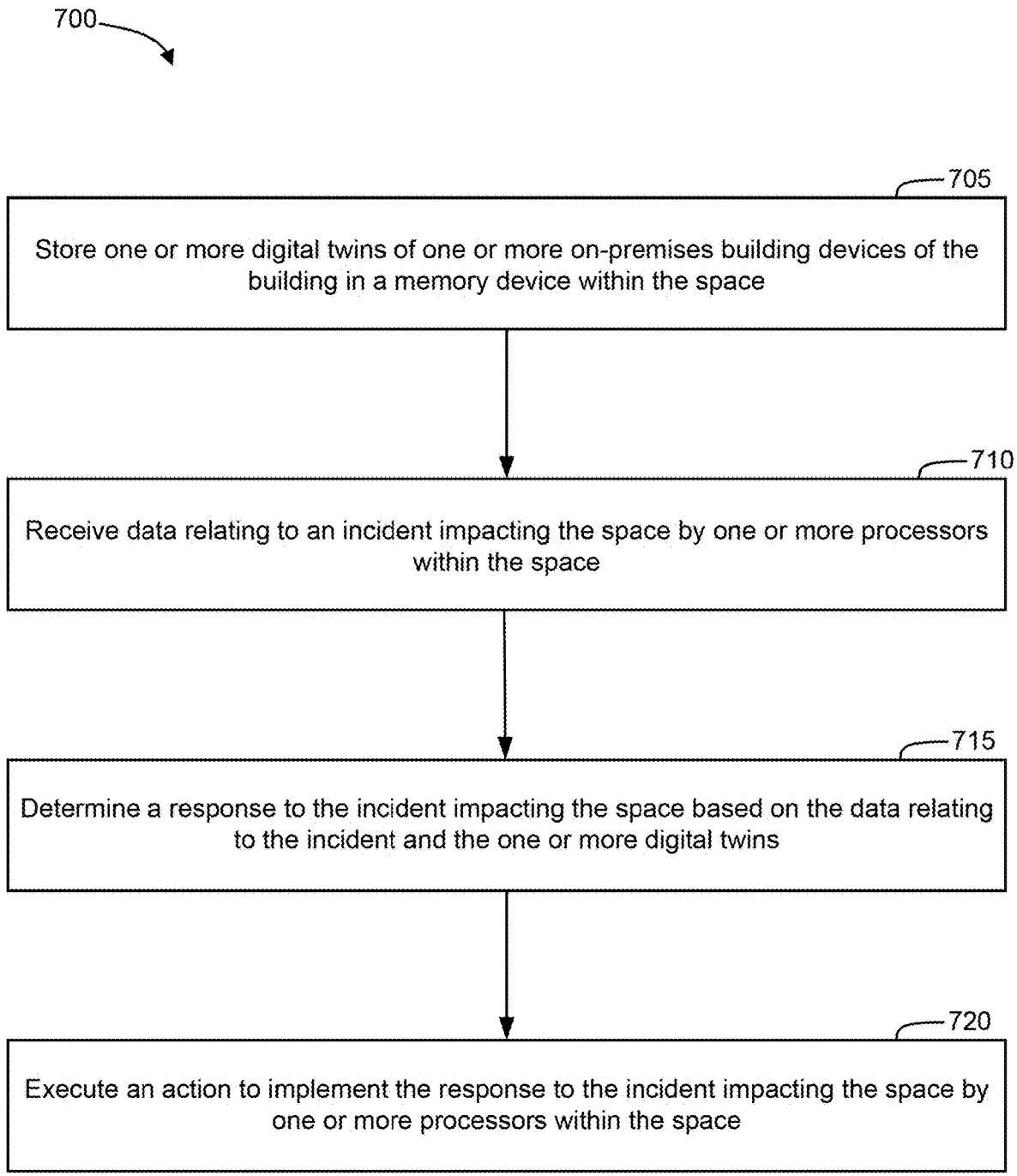
FIG. 7 is a flow diagram of a method of providing on-premises responses to a potential incident in a building, according to an exemplary embodiment.

Referring now to FIG. 7, a method 700 for responding to an incident impacting a building entity is shown, according to an exemplary embodiment. In some embodiments, the digital twin incident response system 400 implements method 700. At step 705, the digital twin incident response system 400 stores one or more digital twins of one or more building devices in a memory device (e.g., memory 515) within a building space (e.g., building entity 440a-440n).

At step 710, the digital twin incident response system 400 receives data relating to an incident impacting the space (e.g., building entity 440a-440n) by one or more processors (e.g., processor 510) within the space. In some embodiments, the digital twin incident response system 400 may receive this data from DTWRs 445a-445n and store this data in the streaming data database 460. The incident can be a potential incident, an incident that is developing, or an active incident, in some embodiments. For example, event modeler 670 generates a possible incident that is a threat to the one or more building entities based on data received from several DTWRs 445a-445n associated with various building entities 440a-440n. In some embodiments, the DTWRs 445a-445n model potential incidents to other entities of the building, such as people, places, physical objects, equipment, and so on. For example, they may create a potential incident that is a threat to a large meeting of people for a district convention that includes the chief executive officer (CEO) of the client's company. As a further example, a potential incident to a visitor of a building that is physically impaired (e.g., has a hearing deficiency, is visually impaired, etc.) is a harmful injury, such as a fall from tripping on a flight of stairs or inability to exit as expected during a fire evacuation. In some embodiments, the digital twin incident response system 400 may also retrieve data relating to on-premises systems (e.g., access control systems, a building management system, etc.) and applications (e.g., on-premises SAP, Oracle, MS Dynamics, etc.). For example, the digital twin incident response system 400 may receive data that indicates an application, such as an on-premises SAP, is corrupted by malware.

At step 715, the digital twin incident response system 400 determines a response to the incident impacting the space based on the data relating to the incident and the one or more digital twins. This response can be determined by one or more processing circuits (e.g., processing circuit 515) in action and mediation engine 465. In some embodiments, DTWRs 445a-445n may work collaboratively with action and mediation engine 465 to determine one or more responses to an incident affecting a building, campus, or city and their associated entities. For example, if an earthquake hits a few buildings on campus, DTWRs may send warnings to other DTWRs associated with campus buildings not to go near that side of campus and work with the action and mediation engine to develop a plan for evacuating any people that might already near the effected buildings safely.

At step 720, the digital twin incident response system 400 executes an action to implement the response to the incident impacting the space by one or more processors within the space. In some embodiments, the processors might be associated with action and mediation engine 465 (e.g., processor 510). In some embodiments, the processors might be associated with one or more DTWRs (DTWR 600 or DTWRs 445a-445n). In some embodiments, the digital twin incident response system 400 may execute an action based on management parameters and/or standard operating procedures set by management personnel. For example, management personnel may set a standard operating procedure that outlines how to safely evacuate building that is facing a fire incident and execute that action based on the standard operating procedure.

Figure 8:
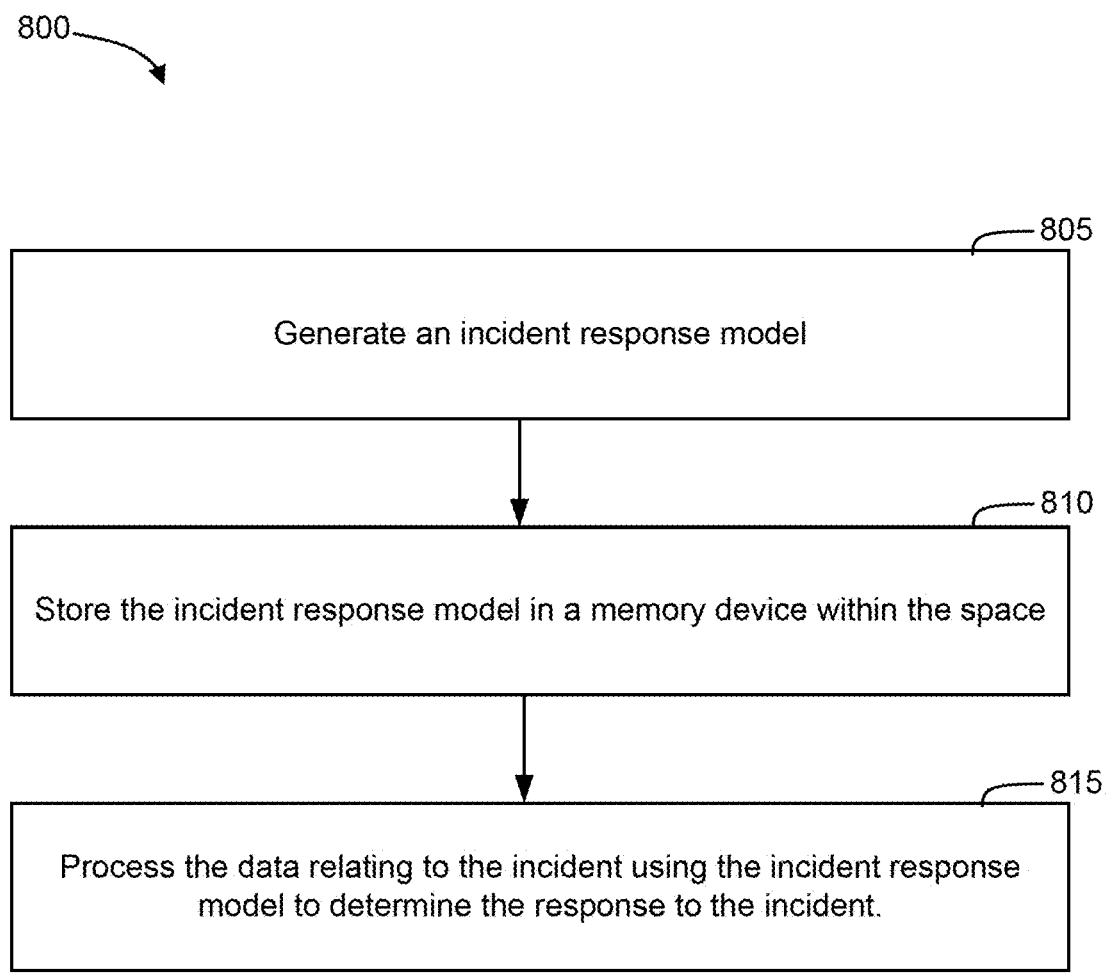
FIG. 8 is a flow diagram of a method of generating an incident response model that may be used for providing on-premises responses to a potential incident in a building, according to an exemplary embodiment.

Referring now to FIG. 8, a method 800 for generating a model based response to an incident is shown, according to an exemplary embodiment. In various embodiments, the digital twin incident response system 400 may be configured to execute, at least in part, the method 800. In other embodiments, the operation of the steps of method 800 are executed in part by the building management platform 140 of FIG. 1. In some embodiments, the method 800 executes at least part of method 700. For example, method 800 models various risks, incidents, and responses associated with building entities. These models may require data obtained in method 700 in some embodiments.

At step 805, the digital twin incident response system 400 generates an incident response model. In some embodiments, action and mediation engine 465 models and evaluates potential risk mitigation solutions proposed by the DTWRs and by its own risk modeling engine, and develops a set of proposed mitigation solutions. In some embodiments, DTWRs associated with building entities (e.g., building spaces, employees, visitors, day care centers, parking structures, access control systems etc.), model risks and potential incidents and stream the context-based modeling results, along with their status, over a access network (e.g., access network 450).

At step 810, the digital twin incident response system 400 stores the incident response model in a memory device (e.g., memory 515) within a building space (e.g., building entity 440a-440n). In some embodiments, step 810 may be executed as part of method 700.

At step 815, the digital twin incident response system 400 processes the data relating to the incident response model to determine the response to the incident. In some embodiments, the digital twin incident response system 400 may process the data using processing circuit 505. In some embodiments, the data processing may be done by DTWRs. In some embodiments, the determined response to the incident in step 815 may be implemented and executed by in step 720 in method 700.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

1. A method of providing on-premises responses to an incident impacting a space of a building, the method comprising:
    storing digital twins of one or more on-premises building devices of the building in a memory device within the space, the digital twins comprising digital representations of the one or more on-premises building devices including data relating to the one or more on-premises building devices;
    receiving, by one or more processors within the space, data relating to the incident impacting the space;
    processing, by the one or more processors within the space, the data using the digital twins stored in the memory device within the space to determine a response to the incident; and
    executing, by the one or more processors within the space, an action to implement the response to the incident.

2. The method of claim 1, wherein processing the data using the digital twins comprises:
    generating an incident response model;
    storing the incident response model in the memory device or a second memory device within the space; and
    processing, by the one or more processors within the space, the data relating to the incident using the incident response model to determine the response to the incident.

3. The method of claim 2, wherein generating the incident response model comprises at least one of generating or updating, by the one or more processors within the space, the incident response model using the digital twins stored within the space.

4. The method of claim 3, wherein the incident response model is generated off-premises and updated by the one or more processors within the space.

5. The method of claim 1, wherein the one or more processors within the space are part of a networking device within the space.

6. The method of claim 1, wherein the digital twins are associated with a plurality of building devices and comprise representations of relationships between the plurality of building devices.

7. The method of claim 1, wherein executing the action to implement the response to the incident comprises executing the action in an absence of network connectivity to at least one off-premises device or other on-premises device outside of the space.

8. The method of claim 1, wherein the data relating to the incident impacting the space includes data relating to other building devices in the space or in other spaces of the building.

9. The method of claim 1, wherein processing the data to determine the response to the incident comprises processing, by the one or more processors within the space, data from one or more digital twins stored within a second space of the building to determine the response to the incident.

10. The method of claim 1, wherein the digital twins comprise digital representations of one or more sensors within the space.

11. The method of claim 1, wherein the digital twins comprise a digital representation of the space.

12. The method of claim 1, wherein the digital twins comprise information about the location of one or more individuals within the space or the building.

13. The method of claim 1, wherein the digital twins comprise information about the environmental conditions that impact the space or the building.

14. One or more non-transitory computer readable media containing program instructions that, when executed by one or more processors, cause the one or more processors to perform operations comprising:
    storing digital twins of one or more on-premises building devices of a building in a memory device within a space of the building, the digital twins comprising digital representations of the one or more on-premises building devices including data relating to the one or more on-premises building devices;
    receiving data relating to an incident impacting the space;
    processing the data using the digital twins to determine a response to the incident; and
    executing an action to implement the response to the incident.

15. The one or more non-transitory computer readable media of claim 14, wherein the program instructions cause the one or more processors to:
    generate an incident response model;
    store the incident response model in the memory device or a second memory device within the space; and
    process the data relating to the incident using the incident response model to determine the response to the incident.

16. The one or more non-transitory computer readable media of claim 15, wherein generating the incident response model comprises at least one of generating or updating the incident response model using the digital twins stored within the space.

17. The one or more non-transitory computer readable media of claim 16, wherein the incident response model is generated off-premises and updated by the one or more processors within the space.

18. The one or more non-transitory computer readable media of claim 14, wherein processing the data to determine the response to the incident comprises processing, by the one or more processors within the space, data from one or more digital twins stored within a second space of the building to determine the response to the incident.

19. A system for providing on-premises response to an incident in a building, the system comprising:
    one or more computer-readable storage media having instructions stored thereon; and
    one or more processing circuits configured to execute the instructions to perform operations comprising:
        storing digital twins of one or more on-premises building devices of the building in a memory device within a space, the digital twins comprising digital representations of the one or more on-premises building devices including data relating to the one or more on-premises building devices;
        receiving data relating to the incident impacting the space;
        processing the data using the digital twins stored in the memory device within the space to determine a response to the incident; and
        executing an action to implement the response to the incident.

20. The system of claim 19, the one or more processing circuits further configured to:
  generate an incident response model;
  store the incident response model in the memory device or a second memory device within the space; and
  process the data relating to the incident using the incident response model to determine the response to the incident.

* * * * *